US006106602A

United States Patent [19]

Ouchi et al.

[11] Patent Number: 6,106,602

[45] Date of Patent: Aug. 22, 2000

[54] HOT-MELT INK COMPOSITION FOR INK JET RECORDING

[75] Inventors: Akemi Ouchi; Tsutomu Maekawa; Atsushi Kakuta, all of Ibaraki, Japan

[73] Assignee: Hitachi Koki Co., Ltd., Tokyo, Japan

[21] Appl. No.: 09/127,871

[22] Filed: Aug. 3, 1998

[30] Foreign Application Priority Data

| | | | |
|---|---|---|---|
| Aug. 1, 1997 | [JP] | Japan | 9-207679 |
| Jun. 30, 1998 | [JP] | Japan | 10-183861 |

[51] Int. Cl.[7] .......... C09D 11/00

[52] U.S. Cl. .......... 106/31.61; 106/31.62

[58] Field of Search .......... 106/31.61, 31.62

[56] References Cited

U.S. PATENT DOCUMENTS

| | | | |
|---|---|---|---|
| 4,659,383 | 4/1987 | Lin et al. | 106/31.61 |
| 5,122,187 | 6/1992 | Schwarz et al. | 106/31.29 |
| 5,350,446 | 9/1994 | Lin et al. | 106/31.61 |
| 5,421,873 | 6/1995 | Arimura et al. | 106/31.29 |
| 5,645,632 | 7/1997 | Pavlin | 106/31.29 |

*Primary Examiner*—Mark L. Bell
*Assistant Examiner*—Veronica F. Faison
*Attorney, Agent, or Firm*—Sughrue, Mion, Zinn, Macpeak & Seas, PLLC

[57] ABSTRACT

A hot-melt ink composition adapted for an ink jet recording process comprising the steps of: heating an ink composition which stays as solid at room temperatures so that it is liquefied; and then applying some jetting energy to the ink composition so that it is jetted onto a recording medium in the form of ink droplet to form a recorded dot, wherein said ink composition comprises a pigment and an alcoholic wax having a hydroxyl value of from 20 to 150 and has a melt viscosity of from 5 to 30 mPa.s upon the use thereof.

9 Claims, No Drawings

HOT-MELT INK COMPOSITION FOR INK JET RECORDING

FIELD OF THE INVENTION

The present invention relates to a hot-melt ink composition for use in ink jet recording apparatus.

BACKGROUND OF THE INVENTION

As an ink composition for ink jet recording there has heretofore been widely used a water-soluble liquid ink composition. However, recording on paper into which an ink can easily infiltrate is liable to "bleeding". Thus, the recording medium for this purpose is limited to coated paper. When an ink is applied onto an overhead projector (hereinafter referred to as "OHP") sheet, it cannot be easily dried. Thus, OHP sheet needs to be subjected to special treatment on the surface thereof. Thus, as an ink composition which can provide a good printing quality regardless of the quality of the paper used, there has been provided a hot-melt ink composition comprising as a material a wax which stays as solid at room temperatures. The hot-melt ink composition is adapted to a hot-melt ink jet recording process which comprises liquefying it by heating or the like, and then applying some energy to the liquid so that it is jetted onto a recording medium on which it is then cooled and solidified while being attached thereto to form a recorded dot.

A great advantage of the above described ink jet recording process is that the above described hot-melt ink stays as solid at room temperatures and thus does not stain hands or any other circumferential things when handled. Another great advantage is that the vaporization of the ink during melting can be minimized, making it possible to prevent the clogging of the nozzle. Further, since the ink composition which has been attached to the recording medium is immediately solidified, it does not bleed on the recording medium. Thus, Various recording media such as Japanese paper, drawing paper and postcard can be used in the above described ink jet recording process without any pretreatment. U.S. Pat. Nos. 4,391,369 and 4,484,948 disclose an ink composition which can provide a good printing quality regardless of the quality of the paper used. JP-A-6-107987 (The term "JP-A" as used herein means an "unexamined published Japanese patent application") and JP-A-5-194897 discloses a hot-melt ink composition for ink jet recording which comprises glyceride incorporated therein to exhibit excellent light transmission properties.

On the other hand, it has been a common practice to use a pigment as an ink colorant for the purpose of improving the weathering resistance of printed matters. Such an ink composition is used as an ink for various printers such as laser printer, fused transfer type printer, liquid ink jet printer and solid ink jet printer.

For example, many reports have been made on pigment ink for use in solid ink jet printer as in JP-A-3-37278, JP-A-4-339871, JP-A-5-16343, JP-A-5-105832, JP-A-6-49400, JP-A-6-228479, JP-A-6-228480, JP-A-6-306319, JP-A-7-109432, JP-A-7-196968, JP-A-7-278477, JP-A-7-306319, JP-A-7-316479, JP-A-7-331141, and JP-A-8-295836.

Further, JP-A-61-159470 discloses a hot-melt ink comprising a vehicle containing a $C_{18-24}$ alcohol, the vehicle having incorporated therein graphite pre-dispersed in an oil carrier compatible with the vehicle. Moreover, JP-W-A-5-506881 (The term as used herein means an "international patent application published in its Japanese national stage") reports a hot-melt ink comprising an alcohol having a molecular weight of from 500 to 1,000 incorporated in a vehicle with other materials.

However, the above described hot-melt ink compositions are disadvantageous in that the materials constituting these ink compositions can hardly maintain a good compatibility therebetween. Thus, these ink compositions are liable to separation of components in molten form particularly when they comprise as a colorant an organic pigment having an excellent weathering resistance incorporated therein. As well known, the sedimentation of particles dispersed in a liquid changes depending on the diameter of the particles, the viscosity of the dispersion medium and the sedimentation time. The higher the viscosity of the dispersing medium is, the more difficultly can be sedimented the particles. On the other hand, the lower the viscosity of the ink for use in printing by an ink jet printer is, the more favorable for use in higher speed operation and higher density printing and more suitable for high reliability printing is the ink. Thus, the two requirements stand opposite each other.

The hot-melt ink jet recording process using an organic pigment having an excellent weathering resistance as a colorant has more advantages than the ink jet recording process using a dye. Thus, this hot-melt ink jet recording process is expected to be applied not only to OA apparatus, general household printers, facsimiles, etc. but also to indoor poster, outdoor poster, large-sized sign-board, decoration on automobiles, decoration on elevator and printing on cloth. However, as previously mentioned, this hot-melt ink jet recording process is disadvantageous in that the ink is liable to separation of components and the two requirements, i.e., high reliability and high printing quality cannot be satisfied at the same time. This disadvantage causes a bottleneck in the way of practical use.

SUMMARY OF THE INVENTION

It is an object of the present invention to provide an ink composition for solid ink jet printer, which not only has excellent fluidic stability and a low viscosity, both enough to be jetted as an ink droplet through a fine nozzle, but also is not liable to separation of its components.

Other objects and effects of the present invention will become apparent from the following description.

The above described objects of the present invention have been achieved by providing a hot-melt ink composition adapted for an ink jet recording process comprising the steps of:

heating an ink composition which stays as solid at room temperatures so that it is liquefied; and then applying some jetting energy to the ink composition so that it is jetted onto a recording medium in the form of ink droplet to form a recorded dot, wherein said ink composition comprises a pigment and an alcoholic wax having a hydroxyl value of from 20 to 150 and has a melt viscosity of from 5 to 30 mPa.s upon the use thereof.

In a preferred embodiment, the alcoholic wax is at least one wax selected from the group consisting of: alcoholic wax comprising, as a main component, a saturated straight-chain alcohol; paraffin wax; microcrystalline wax; and alcoholic wax prepared by oxidation reaction of petrolatum as a starting material.

In a further preferred embodiment, the alcoholic wax is a $C_{25-55}$ saturated straight-chain alcohol.

The alcoholic wax is preferably contained in an amount of not less than 20% by weight based on the weight of the composition.

DETAILED DESCRIPTION OF THE INVENTION

In Kitahara, "Bunsan Gyoushu no Kaimei to Ouyou Gijustu (Elucidation and Applied Technique of Dispersion and Aggregation)", Technosystem, 1996, a behavior basically represented by the following equation is known as to the sedimentation time t of spherical dispersed particles in a liquid:

$$t=18\eta H/(\rho-\rho_0)gD^2$$

wherein η represents the viscosity of the liquid, H represents the sedimentation distance, ρ represents the density of the dispersed particles, $\rho_0$ represents the density of the dispersing medium, D represents the diameter of the dispersed particles, and g represents the gravitational acceleration.

In an actual system, the sedimentation time may deviate quantitatively from the above described equation. However, a common tendency is that the sedimentation time of dispersed particles changes almost proportionally to the viscosity of the liquid while the sedimentation rate of dispersed particles changes almost inversely proportional to the viscosity of the liquid if other conditions remain the same. Thus, it is desired that the viscosity of the liquid is as high as possible to provide an ink having a good dispersion stability which can hardly be sedimented. The viscosity of an ink is predetermined to a proper range depending on the properties of the printer to which it is applied. In general, it falls within the range of from 10 to 30 mPa.s. However, if as the colorant there is used a pigment having a low solubility in a solvent (vehicle), it is usually difficult to predetermine conditions which can satisfy the two requirements, i.e., proper viscosity and sedimentation rate. For the details of hardened oil obtained by extremely hydrogenating vegetable oil and its role as a dispersant, reference can be made to many citations, including "Yushi Kagaku Binran (Handbook of Oil and Fat Chemistry)", Japan Oil Chemists' Society, Maruzen, 1990, Kenzo Fusegawa, "Wakkusu no Seishitsu to Ouyou (Properties and Application of Waxes)", Saiwai Shobo, 1988, and Keiichi Inaba et al., "Shibousan Kagaku (Aliphatic Acid Chemistry)", Saiwai Shobo, 1990.

As the alcoholic wax for use in the present invention there may be preferably used a completely saturated straight-chain wax having hydroxyl groups uniformly attached to all constituent carbons richer in reactivity than conventional alcohols obtained by fractional distillation.

Specific examples of such an alcoholic wax include UNILIN 350, UNILIN 425, UNILIN 700, and ethoxylation products thereof, e.g., UNITOX 420, UNITOX 450, UNITOX 480, UNITOX 520, UNITOX 550, UNITOX 720 and UNITOX 750 (produced by Toyo Petrolite Co., Ltd.). Preferred examples of alcohol-rich alcoholic wax prepared by oxidation reaction of paraffin wax, microcrystalline wax or petrolatum as starting material include OX1949, OX020T, NPS9210, NPS9125, and NPS9035 (produced by Nippon Seiro Co., Ltd.). Further examples of such a wax include KOW, VLTN-4, VLTN-55, and VLTN-6 (produced by Kawaken Finechemical Co., Ltd.). Particularly preferred among these waxes are UNILIN 425, UNILIN 550, and OX 1949.

The wax for use herein has a hydroxyl value of from not less than 20 to not more than 150, preferably from 60 to 130. If the hydroxyl value of the wax falls below 20, the pigment is insufficiently dispersed in the wax and thus can be easily precipitated. On the contrary, if the hydroxyl value of the wax exceeds 150, the resulting excessive polarization causes the pigment and the vehicle to be separated from each other.

The hydroxyl value as used herein is determined according to the measurement method defined in ASTM E222 (revised edition). Referring to the standard of hydroxyl value relative to molecular weight of alcoholic wax, the value of "hydroxyl value/(57×molecular weight)" is preferably not more than 1, more preferably from 0.5 to 1.

The melt viscosity of the ink composition of the present invention is desirably from 5 to 50 mPa.s, preferably from 5 to 30 mPa.s, at temperatures from 100 to 150° C. which are operating temperatures of an ink jet head. If the melt viscosity of the ink composition of the present invention falls below 5 mpa.s, the sedimentation of the pigment cannot be prevented. On the contrary, if the melt viscosity of the ink composition of the present invention exceeds 50 mPa.s, ink jet recording can hardly be conducted.

Referring to the requirement for viscosity, the number of carbon atoms in the alcoholic wax is preferably predetermined to the range of from about 18 to 100, particularly from 25 to 55. If the number of carbon atoms in the alcoholic wax falls below 18, the resulting wax has too low a viscosity to provide a sufficient pigment dispersion stability. On the contrary, if the number of carbon atoms in the alcoholic wax exceeds 100, the resulting wax has too high a viscosity to provide desired ink jet recording. For the same reason, the molecular weight of the alcoholic wax is generally from 200 to 1,500, preferably from 300 to 700.

The melting point of the ink composition of the present invention is preferably from not lower than 50° C. to not higher than 120° C., particularly from not lower than 70° C. to not higher than 100° C., from the standpoint of jetting stability of ink and storage stability of printed matters.

Since the ink composition of the present invention needs to be fast to heat and light, it is particularly preferred that the ink composition of the present invention has an acid value of not more than 12.0 and an iodine value of not more than 3. If such an ink composition is used for ink jet recording, the resulting printed matters exhibit a sufficient storage stability.

The ink composition comprising an alcoholic wax of the present invention exhibits a good compatibility with vegetable waxes such as candelilla wax, carnauba wax and Japan wax. Thus, the ink composition of the present invention can be mixed with these vegetable waxes to have improved properties. Other examples of additives which can be incorporated in the ink composition of the present invention include petroleum waxes such as paraffin wax and microcrystalline wax, higher saturated or unsaturated aliphatic acids such as polyethylene wax, stearic acid and behenic wax, ketones such as stearon and lauron, aliphatic acid ester amides, saturated or unsaturated aliphatic acid amides, aliphatic acid esters, glycerides, and high molecular weight resins such as rosin-based resin, hydrocarbon-based resin, amide-based resin, polyester, polyvinyl acetate, acrylic acid-based or methacrylic acid-based polymer, styrene-based polymer, ethylene acetate-vinyl copolymer, polyketone, silicone and coumarone.

As the aliphatic acid ester amide there may be selected, e.g., CPH-380N (produced by C.P. Hall), Kawaslip-SA (produced by Kawaken Finechemical Co., Ltd.).

Examples of aliphatic acid amide employable herein include lauric acid amide, stearic acid amide, oleic acid amide, erucic acid amide, ricinolic acid amide, stearic acid ester amide, palmitic acid amide, behenic acid amide, and brassidic acid amide. Examples of N-substituted aliphatic acid amide include N,N'-2-hydroxystearic acid amide, N,N'-ethylenebisoleic acid amide, N,N'-xylenebisstearic acid amide, stearic acid monomethylyolamide, N-oleylstearic acid amide, N-stearylerucic acid amide, N,N'-dioleyladipic acid amide, N,N'-dioleylsebacic acid amide, N,N'-distearylisophthalic acid amide, and 2-stearamide ethyl stearate.

As the aliphatic acid ester there may be preferably used a monovalent or polyvalent aliphatic acid ester. Examples of such an aliphatic acid ester include sorbitan monopalmitate, sorbitan monostearate, sorbitan monobehenate, polyethylene glycol monostearate, polyethylene glycol distearate, propylene glycol monostearate, and ethylene glycol distearate.

Specific examples of aliphatic acid esters employable herein include Rheodol SP-S10, Rheodol SO-S30, Rheodol S SA10, Emasol P-10, Emasol S-10, Emasol S-20, Emasol B, Rheodol Super SP-S10, Emanone 3199, Emanone 3299, and Excepar1 PE-MS (produced by Kao Corp.).

Most preferred is aliphatic acid ester of glycerin. Examples of such an aliphatic acid ester of glycerin include stearic acid monoglyceride, palmitic acid monoglyceride, oleic acid monoglyceride, and behenic acid monoglyceride.

Specific examples of these aliphatic acid ester of glycerin include Rheodol MS-50, Rheodol MS-60, Rheodol MS-165, Rheodol MO-60, Excepar1 G-MB (produced by Kao Corp.), deodorized and purified carnauba wax No. 1, purified candelilla wax No. 1 (produced by CERARICA NODA CO., LTD.), Synchrowax ERL-C, Synchrowax HR-C (produced by Kuroda Co., Ltd.), and KF2 (produced by Kawaken Finechemical Co., Ltd.).

As a special ester-based wax there may be selected Excepar1 DS-C2 (produced by Kao Corp.), and Kawaslip-L and Kawaslip-R (produced by Kawaken Finechemical Co., Ltd.), Batyl Stearate (produced by Nippon Surfactant). Further, higher alcohol esters of higher aliphatic acid such as myricyl cerotate, ceryl cerotate, ceryl montanate, myricyl palmitate, myricyl stearate, cetyl palmitate and cetyl stearate may be selected.

Aliphatic acid amides exhibit a low melt viscosity at about 100° C. and thus can exert a remarkable effect of lowering the melting point of the ink and the melt viscosity of the ink. Aliphatic acid amides provide the ink with a stable fluidity during melting. Further, the resulting printed image has a strength high enough to resist rubbing or folding. Aliphatic acid esters exhibit a low melt viscosity and thus provide the ink with a stable fluidity during melting. Further, aliphatic acid esters exhibit a higher flexibility and a stronger surface protection than carbon—carbon bond. Thus, the resulting printed image can withstand folding. A preferred aliphatic acid ester exhibits a penetration index of not less than 1 and can be easily pressed. Further, such an aliphatic acid ester preferably exhibits a viscosity of less than 20 mPa.s.

Polyamides can be roughly divided into two groups, i.e., aromatic polyamide and dimeric acid polyamide. In the present invention, dimeric acid-based polyamides are particularly preferred. Further, the base on which these polyamides are based is preferably oleic acid, linoleic acid, linolenic acid or eleostearic acid.

Specific examples of polyamides include amide-based resins such as Versamid 711, Versamid 725, Versamid 930, Versamid 940, Versalon 1117, Versalon 1138 and Versalon 1300 (produced by Henkel Japan Ltd.), Tohmide 391, Tohmide 393, Tohmide 394, Tohmide 395, Tohmide 397, Tohmide 509, Tohmide 535, Tohmide 558, Tohmide 560, Tohmide 1310, Tohmide 1396, Tohmide 90 and Tohmide 92 (produced by Fuji Kasei Kogyo Co., Ltd.), Sylvamid E5 (produced by Arizona Chemical), UNIREZ 2970 (produced by Union Camp), polyesters such as KTR2150 (produced by Kao Corp.), polyvinyl acetates such as AC401, AC540 and AC580 (produced by Allied Chemical Corp.), silicones such as Silicone SH6018 (produced by Toray Silicone Co., Ltd.), Silicone KR215, Silicone KR216, Silicone KR220 (produced by Shin-Etsu Silicone Co., Ltd.), and coumarones such as Escuron (produced by Nippon Steel Chemical Co., Ltd.).

As the vehicle for use herein there may be used at least one selected from the group consisting of the above described compounds or a mixture of two or more compounds selected from the group. All these compounds can fairly wet the recording medium and thus exhibit a high adhesion. Further, these compounds exhibit an excellent adhesivity to various adherends.

As the colorant there may be preferably used a pigment having an excellent heat stability which can be fairly dispersed in the above described vehicle. Organic or inorganic pigments having the following numbers listed in color index may be used in the present invention but the present invention is not specifically limited thereto.

As red or magenta pigments there may be used Pigment Red 3, 5, 19, 22, 31, 38, 43, 48:1, 48:2, 48:3, 48:4, 49:5, 49:1, 53:1, 57:1, 57:2, 58:4, 63:1, 81, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, 88, Pigment Orange 13, 16, 20, 36 depending on the purpose. As blue or cyan pigments there may be used Pigment Blue 1, 15, 15:1, 15:2, 15:3, 15:4, 15:6, 16, 17:1, 22, 27, 28, 29, 36, 60 depending on the purpose. As green pigments there may be used Pigment Yellow 1, 3, 12, 13, 14, 17, 34, 35, 37, 55, 74, 81, 83, 93, 95, 97, 108, 109, 110, 137, 138, 139, 153, 154, 155, 166, 167, 168, 180, 185, 193. As black pigments there may be used Pigment Black 7, 28, 26 depending on the purpose.

Specific example of trade name of these pigments include Chromofine Yellow 2080, 5900, 5930, AF-1300, 2700L, Chromofine Orange 3700L, 6730, Chromofine Scarlet 6750, Chromofine Magenta 6880, 6886, 6891N, 6790, 6887, Choromofine Violet RE, Chromofine Red 6820, 6830, Chromofine Blue HS-3, 5187, 5085N, SR-5020, 5026, 5050, 4920, 4927, 4937, 4824, 4933GN-EP, 4940, 4973, 5205, 5208, 5214, 5221, 5000P, Chromofine Green 2GN, 2GO, 2G-550D, 5310, 5370, 6830, Chromofine Black A-1103, Seika Fast Yellow 10GH, A-3, 2035, 2054, 2200, 2270, 2300, 2400 (B), 2500, 2600, ZAY-260, 2700 (B), Seika Fast Red 8040, C405 (F), CA120, LR-116, 1531B, 8060R, 1547, ZAW-262, 1537B, GY, 4R-4016, 3820, 3891, ZA-215, Seika Fast Carmine 6B1476T-7, 1483LT, 3840, 3870, Seika Fast Bordeaux 10B-430, Seika Light Rose R40, Seika Light Violet B800, 7805, Seika Fast Maroon 460N, Seika Fast Orange 900, 2900, Seika Light Blue C718, A612, Cyanine Blue 4933M, 4933GN-EP, 4940, 4973 (produced by DAINICHISEIKA COLOR & CHEMICALS MFG. CO., LTD.), KET Yellow 401, 402, 403, 404, 405, 406, 416, 424, KET Orange 501, KET Red 301, 302, 303, 304, 305, 306, 307, 308, 309, 310, 336, 337, 338, 346, KET Blue 101, 102, 103, 104, 105, 106, 111, 118, 124, KET Green 201 (produced by DAINIPPON INK & CHEMICALS, INC.), Colortex Yellow 301, 314, 315, 316, P-624, 314, U1OGN, U3GN, UNN, UA-414, U263, Finecol Yellow T-13, T-05, Pigment Yellow 1705, Colortex Orange 202, Colortex Red 101, 103, 115, 116, D3B, P-625, 102, H-1024, 105C, UFN, UCN, UBN, U3BN, URN, UGN, UG276, U456, U457, 105C, USN, Colortex Maroon 601, Colortex Brown B610N, Colortex Violet 600, Pigment Red 122, Colortex Blue 516, 518, 519, A818, P-908, 510, Colortex Green 402, 403, Colortex Black 702, U905 (produced by Sanyo Colorworks, Ltd.), Lionol Yellow 1405G, Lionol Blue FG7330, FG7350, FG7400G, FG7405G, ES, ESP-S (produced by TOYO INK MFG. CO., LTD.), Toner Magenta E02, Permanent Rubin F6B, Toner Yellow HG, Permanent Yellow GG-02, Hostapeam Blue B2G (produced by Hoechst Industry Co., Ltd.), and Carbon Black #2600, #2400, #2200, #1000, #990, #980, #970, #960, #850, MCF88, #750, #650, MA600, MA7, MA8, MA11, MA100, MA100R, MA77, #52, #50, #47, #45, #45L, #40, #33, #32, #30, #25, #20, #10, #5, #44, CF9 (produced by Mitsubishi Chemical Corporation).

A solvent dye may be used as a colorant in combination with the above described compounds. Any colorants such as oil dye may be used so far as they can be adapted to other ink components.

The proper amount of the pigment to be incorporated is from 0.2 to 5% by weight, particularly from 0.5 to 3% by weight based on the weight of the ink. If the amount of the pigment to be incorporated falls below 0.2% by weight, the resulting printed image has a deteriorated quality. On the contrary, if the amount of the pigment to be incorporated exceeds 5% by weight, it has an adverse effect on the viscosity of the resulting ink. Two or more kinds of colorants may be properly used in admixture for the purpose of adjusting the color tone or like purposes. The ink composition of the present invention may comprise various surface treating agents, surface active agents, viscosity depressants, oxidation inhibitors, age resistors, crosslinking accelerators, ultraviolet absorbers, plasticizers, preservatives, dispersants, dyes, etc. incorporated therein to become more functional.

For the mixing and dispersion of the above described vehicle, colorant and other components, various known grinding or dispersing apparatus may be used without any restriction. These apparatus can be classified into some groups, i.e., high speed rotary mill, roller mill, container-driven medium mill, medium-agitated mill, jet mill, etc. Examples of these apparatus include high speed disperser, impeller disperser, gate mixer, bead mixer, sandmill, pearl mill, cobra mill, pin mill, molinex mill, agitating mill, universal mill, century mill, pressure mill, agitator mill, two-roll extruder mill, two-roll mill, three-roll mill, niche mill, kneader, mixer, colloid mill, stone mill, KD mill, planetary mill, ball mill, paddle mill, attritor, flow jet mixer, slasher mill, peg mill, microfluidizer, clearmix, rhinomill, homogenizer, bead mill with pin, and horizontal bead mill.

The kneading time may be arbitrarily predetermined depending on the kind of the apparatus used. As the kneading method there may be used any method which can be applied to coating, ink, resin colorant, etc. Examples of the kneading method employable herein include a method which comprises melt-kneading known components in one lot, a method which comprises incorporating a colorant in a high concentration to give a masterbatch which is then diluted, a method which comprises sequentially adding components during kneading, and a flush method which comprising dispersing components in a liquid which is then introduced into a solid phase.

The preparation of a high quality ink for ink jet recording requires that many important factors be well balanced. The ink of the present invention can satisfy some known requirements to apply itself to hot-melt ink jet printer. In other words, the ink of the present invention exhibits a sufficient hardness and stability at room temperature and is reliable in storage before printing and image quality after printing. The ink image which has been attached to the recording medium has a sufficient transparency and saturation. The ink forms a uniform thin film on the recording medium to give a printed matter having a good image quality. These requirements are complicated and cannot necessarily be expressed numerically for the ink of the present invention. In general, however, a hot-melt ink having a relatively low melting point can easily permeate through the recording medium and thus can cause offset. It is necessary that the resulting printed matters be not liable to offset even when stored stacked at a temperature of 40° C. However, the higher the melting point of the ink is, the higher is the viscosity of the ink. The melt viscosity of the ink during printing is preferably not higher than 50 mPa.s, particularly from 5 to 30 mPa.s, from the standpoint of the operation of the apparatus. Excessive viscosity requires a higher energy for jetting. On the contrary, the material having too low a viscosity leaves something to be desired in storage stability at room temperature. The ink of the present invention preferably exhibits a viscosity of not lower than 10,000 mPa.s at a temperature of 25° C.

Referring to the folding properties of the printed matter, it is desirable that the ink pass endurance on a diameter of 5 mm or less, particularly 3 mm or less, in mandrel test using transparency film. The optimum temperature at which the ink is melted during printing is from 100° C. to 150° C. to provide a simple and inexpensive apparatus. The surface tension of the ink of the present invention during melting is preferably not higher than 40 mN/m. The volumetric change developed when the ink of the present invention changes its phase from molten to solid is preferably not more than 10%.

The ink composition of the present invention can be applied to conventional known ink jet printers which can jet ink droplets only when printing is required, such as office printer, printer for use in industrial marking, wide format type printer, printer for printing plate and plate making, label printer and all types of printers having this typical operation. Examples of the recording medium to which the ink of the present invention can be applied include paper, plastic film, capsule, gel, metal foil, and cloth. Since the ink of the present invention can be used in non-contact printing, the recording medium may be in various forms. The form of the recording medium to which the ink of the present invention can be applied is not limited to the above described forms. The ink of the present invention can be applied to a recording process which comprises recording an image on a transfer body from which it is then transferred to a recording medium or a recording process using a pressure-heating apparatus.

The present invention will be described in greater detail with reference to the following Examples, but the present invention should not be construed as being limited thereto.

Table 1 shows the composition and viscosity of various inks and the results of evaluation of dispersibility of the inks. Table 2 shows the constituent materials, manufacturer and trade name of inks used.

TABLE 1

| Classification Ink composition/ | Example | | | | | Comparative Example | |
|---|---|---|---|---|---|---|---|
| No. (wt %) | 1 | 2 | | 3 | 4 | 1 | 2 |
| A-wax | | | | | | | |
| A-1 | 20 | | | | 49 | 17 | |
| A-2 | | 50 | 50 | 49 | | | |
| A-3 | | | | | 49 | | |
| E-amide | | 48 | 48 | 30 | | | 99 |
| E-1 | | | | | | | |

TABLE 1-continued

| Classification Ink composition/ | Example | | | | | Comparative Example | |
|---|---|---|---|---|---|---|---|
| No. (wt %) | 1 | 2 | | 3 | 4 | 1 | 2 |
| Wax | 77 | | | | | 77 | |
| W-1 | | | | | | | |
| EVA | | | | 20 | | | |
| V-1 | | | | | | | |
| Colorant | | | | | | | |
| Blue pigment | | | | 1 | 2 | | 1 |
| Red pigment | | 2 | | | | | |
| Yellow pigment | 3 | | | | | 6 | |
| Black pigment | | | 2 | | | | |
| Blue dye | | | | 1 | | | |
| Melt viscosity (mPa · s) | 12 | 10 | 12 | 11 | 10 | 60 | 15 |
| Percent defective jetting (%) | 0 | 0 | 0 | 0 | 0 | 70 | 30 |
| Separation (%) | 0 | 0 | 0 | 0 | 0 | 0 | 18 |

TABLE 2

| Classification | Symbol | Manufacturer | Trade name |
|---|---|---|---|
| Alcoholic wax (A-wax) | A-1 | Toyo Petrolite Co., Ltd. | UNILINS50 |
| | A-2 | Nippon Seiro Co., Ltd. | OX020T |
| | A-3 | Nippon Seiro Co., Ltd. | OX1914 |
| Aliphatic acid ester amide (E-amide) | E-1 | Kawaken Fine chemical Co., Ltd. | Kawaslip SA |
| Carnauba wax (wax) | W-1 | CERARICA NODA CO., LTD. | Carnauba Wax No. 1 |
| Polyvinyl acetate (EVA) | V-1 | Allied Chemical Corp. | AC401 |
| Colorant | Blue pigment | TOYO INK MFG. CO., LTD. | Lionol Blue FG 7350 |
| | Red pigment | DAINICHISEIKA COLOR & CHEMICALS MFG. CO., LTD. | Choromofine Magenta 6880 |
| | Yellow pigment | DAINICHISEIKA COLOR & CHEMICALS MFG. CO., LTD. | Seika Fast Yellow 2200 |
| | Black pigment | Mitsubishi Chemical Corporation | Carbon Black MA77 |
| | Blue dye | Daiwa Chemical | Cleosol Fast Blue GL |

EXAMPLE 1

400 g of a mixture of 20% by weight of an alcoholic wax (trade name: UNILIN 550, produced by Toyo Petrolite Co., Ltd.) and 77% by weight of Carnauba Wax No. 1 (produced by CERARICA NODA CO., LTD.) as vehicle and 3% by weight of a yellow pigment (trade name: Seika Fast Yellow, produced by DAINICHISEIKA COLOR & CHEMICALS MFG. CO., LTD.) as a colorant was heated and kneaded at a temperature of 130° C. in an attritor (MA01SC, produced by MITSUI MINING CO., LTD.) until a homogeneous molten mixture was obtained (for about 5 hours). Subsequently, the mixture was filtered under heating and pressure to remove impurities therefrom, and then allowed to cool at room temperature to obtain a homogeneous yellow hot-melt ink composition.

The yellow hot-melt ink composition was heated to a temperature of 130° C. where it was then measured for melt viscosity by means of a rotational viscometer (Type EDL, produced by TOKIMEC INC.). This measurement was conducted five times. The measurements were then averaged to obtain 12 mPa.s.

This ink was then loaded in an ink jet printer (Type JOLT SJO1A, produced by Hitachi Koki Co., Ltd.). When the printer was operated, the ink was recognized to be jetted from all 96 nozzles. The ink was allowed to stand in molten form for 3 days. The ink was then again jetted. The number of nozzles which did not work was examined. As a result, all the nozzles were recognized to jet the ink without any problems.

About 10 g of the ink was allowed to stand molten at a temperature of 135° C. in a test tube having a diameter of 12 mm. The ink dispersion showed no separation of components even after one week.

EXAMPLE 2

500 g of a mixture of 50% by weight of UNILIN 550 and 48% by weight of an ester amide (trade name: Kawaslip SA, produced by Kawaken Finechemical Co., Ltd.) as vehicle and 2% by weight of a red pigment (trade name: Chromofine Magenta 6880, produced by DAINICHISEIKA COLOR & CHEMICALS MFG. CO., LTD.) and a black pigment (trade name: Carbon Black MA77, produced by Mitsubishi Chemical Corporation) as a colorant was heated and kneaded at a temperature of 130° C. by means of a clearmix (Type MA01SC, produced by Seiko EG & G Co., Ltd.) until a homogenous molten mixture was obtained (for about 3 hours). Subsequently, the mixture was filtered under heating and pressure to remove impurities therefrom, and then allowed to cool at room temperature to obtain homogeneous magenta and black hot-melt ink compositions.

The two color hot-melt ink compositions were then measured for melt viscosity by means of a rotational viscometer (Type EDL, produced by TOKIMEC INC.) in the same manner as in Example 1. This measurement was conducted five times. The measurements were then averaged to obtain 10 and 12 mPa.s, respectively.

The two inks were each then loaded in an ink jet printer. When the printer was operated, the two inks were each recognized to be jetted from all 96 nozzles. The two inks were each allowed to stand in molten form for 3 days. The two inks were each then again jetted. The number of nozzles which did not work was examined. As a result, all the nozzles were recognized to jet the ink without any problems.

The two inks were each allowed to stand molten at a temperature of 135° C. in a test tube having a diameter of 12 mm. The ink dispersion showed no separation of components even after one week.

EXAMPLE 3

500 g of a mixture of 49% by weight of an alcoholic wax (trade name: OX020T, produced by Nippon Seiro Co. Ltd.), 30% by weight of Kawaslip SA and 20% by weight of a polyvinyl acetate (trade name: AC401, produced by Allied Chemical Corp.) as vehicle and 1% by weight of a blue pigment (trade name: Chromofine Blue 4973, produced by DAINICHISEIKA COLOR & CHEMICALS MFG. CO., LTD.) and 1% by weight of a blue dye (trade name: Oleosol Fast Blue GL, produced by Daiwa Chemical Co., Ltd.) as colorant was heated and kneaded at a temperature of 130° C. by means of an agitating mill (produced by Kurimoto, Ltd.) until a homogenous molten mixture was obtained (for about 6 hours). Subsequently, the mixture was filtered under heating and pressure to remove impurities therefrom, and then allowed to cool at room temperature to obtain a homogeneous cyan hot-melt ink composition.

The hot-melt ink composition was then measured for melt viscosity by means of a rotational viscometer (Type EDL, produced by TOKIMEC INC.) in the same manner as in Example 1. This measurement was conducted five times. The measurements were then averaged to obtain 11 mPa.s, respectively.

The ink was then loaded in an ink jet printer. When the printer was operated, the ink was recognized to be jetted from all nozzles. The ink was allowed to stand in molten form for 3 days. The ink was then again jetted. The number of nozzles which did not work was examined. As a result, all the nozzles were recognized to jet the ink without any problems.

The ink was allowed to stand molten at a temperature of 135° C. in a test tube having a diameter of 12 mm. The ink dispersion showed no separation of components even after one week.

EXAMPLE 4

500 g of a mixture of 49% by weight of UNILIN 550 and 49% by weight of OX1949 (produced by Nippon Seiro Co., Ltd.) as vehicle and 2% by weight of a blue pigment (Lionol Blue FG 7350) as a colorant was heated and kneaded at a temperature of 130° C. until a homogeneous molten mixture was obtained (for about 6 hours). Subsequently, the mixture was filtered under heating and pressure to remove impurities therefrom, and then allowed to cool at room temperature to obtain a homogeneous cyan hot-melt ink composition.

The hot-melt ink composition was then measured for melt viscosity by means of a rotational viscometer (Type EDL, produced by TOKIMEC INC.) in the same manner as in Example 1. This measurement was conducted five times. The measurements were then averaged to obtain 10 mPa.s, respectively.

The ink was then loaded in an ink jet printer. When the printer was operated, the ink was recognized to be jetted from all nozzles. The ink was allowed to stand in molten form for 3 days. The ink was then again jetted. The number of nozzles which did not work was examined. As a result, all the nozzles were recognized to jet the ink without any problems.

The ink was allowed to stand molten at a temperature of 135° C. in a test tube having a diameter of 12 mm. The ink dispersion showed no separation of components even after one week.

COMPARATIVE EXAMPLE 1

A mixture of 17% by weight of UNILIN 550 as used in Example 1 as a vehicle and 6% by weight of the same yellow pigment as used in Example 1 as a colorant was heated and melted at a temperature of 120° C. in an attritor until a homogeneous molten mixture was obtained (for 5 hours). Subsequently, the mixture was filtered under heating and pressure to remove impurities therefrom, and then allowed to cool at room temperature to obtain a homogeneous yellow hot-melt ink analogue. The yellow hot-melt ink analogue was heated to a temperature of 130° C. where it was then measured for melt viscosity by means of a rotational viscometer (Type EDL, produced by TOKIMEC INC.) in the same manner as in Example 1. This measurement was conducted five times. The measurements were then averaged to obtain 60 mPa.s.

The ink analogue was then loaded in an ink jet printer and examined for jettability in the same manner as in Example 1. As a result, about 70% of the nozzles (70 nozzles) showed defective even when a voltage higher than normal value was applied.

The ink analogue was allowed to stand molten at a temperature of 135° C. in a test tube having a diameter of 12 mm. As a result, the ink analogue showed no separation of components even after 1 week.

COMPARATIVE EXAMPLE 2

500 g of a mixture of 99% by weight of Kawaslip SA as a vehicle and 1% by weight of a blue pigment (Lionol Blue FG 7350) as a colorant was heated and kneaded at a temperature of 130° C. by means of an agitating mill (produced by Kurimoto, Ltd.) until a homogeneous molten mixture was obtained (for about 6 hours). Subsequently, the mixture was filtered under heating and pressure to remove impurities therefrom, and then allowed to cool at room temperature to obtain a homogeneous cyan hot-melt ink analogue.

The hot-melt ink analogue was heated to a temperature of 130° C. where it was then measured for melt viscosity by means of a rotational viscometer (Type EDL, produced by TOKIMEC INC.) in the same manner as in Example 1. This measurement was conducted five times. The measurements were then averaged to obtain 15 mPa.s.

The ink analogue was then loaded in an ink jet printer and examined for jettability in the same manner as in Example 1. As a result, the ink analogue was jetted from all the nozzles at the initial stage. The ink analogue was then allowed to stand in a molten form for 3 days. The ink analogue was then again jetted. As a result, about 30% of the nozzles (30 nozzles) showed defective even when a voltage higher than normal value was applied.

The ink analogue was allowed to stand molten at a temperature of 135° C. in a test tube having a diameter of 12 mm. When two days passed, an upper layer free of colorant appeared on the top of the dispersion in a proportion of about 18%, demonstrating that the liquid was divided into two layers.

EXAMPLES 5 AND 6 AND COMPARATIVE EXAMPLES 3 AND 4

500 g of a mixture of a behenyl alcohol (Comparative Example 3), UNILIN 350 (Example 5), UNILIN 700 (Example 6) and a polywax 500 (ComParative Example 4) (produced by Toyo Petrolite Co., Ltd.) as vehicle and 2% by weight of a magenta pigment (KET Red 310, produced by DAINIPPON INK & CHEMICALS, INC.) as a colorant was heated and kneaded at a temperature of 130° C. by means of a motor mill (produced by Eiger Japan K.K.) until a homogeneous molten mixture was obtained (for about 6 hours). Subsequently, the mixture was filtered under heating and pressure, and then allowed to cool at room temperature to obtain a homogeneous magenta hot-melt ink composition and a homogeneous hot-melt ink analogue. Polywax 500 is a material belonging to polyethylene wax.

The hot-melt ink composition and hot-melt ink composition analogue were then subjected to measurement of melt viscosity at 130° C., 135° C. ageing test for evaluation of fastness to separation and test for jettability from ink jet printer after 1 week of ageing in the apparatus in molten form in the same manner as in Example 1. The results are set forth in Table 3.

TABLE 3

| | Comparative Example 3 | Example 5 | Example 6 | Comparative Example 4 |
|---|---|---|---|---|
| Vehicle | Behenyl alcohol | UNILIN 350 | UNILIN 700 | Polywax 500 |
| Hydroxyl value | 174 | 129 | 65 | <20 |
| Pigment | KET Red 310 (2% by weight) | | | |
| Viscosity (mpa·s) (130° C.) | 5 | 9 | 12 | >30 |
| Separation (135° C.) | Separation (<1 day) | Stable (>1 week) | Stable (>1 week) | Separation (<1 day) |
| Test for jettability from printer | Jetted from not all nozzles | Jetted from all nozzles | Jetted from all nozzles | Jetted from not all nozzles |

While all the inks comprising UNILIN 350 (Example 5) and UNILIN 700 (Example 6) exhibited good properties, those comprising as a vehicle a behenyl alcohol having a hydroxyl value of not less than 150 (Comparative Example 3) and Polywax 500 having a hydroxyl value of not more than 20 (Comparative Example 4) exhibited a remarkably deteriorated dispersion stability and thus could be little jetted from the printer.

EXAMPLE 7

500 g of a mixture of UNILIN 425 (produced by Toyo Petrolite Co., Ltd.) alone as a vehicle and 2% by weight of a yellow pigment PY93 (produced by Sanyo Colorworks, Ltd.), 2% by weight of a magenta pigment (KET Red 309, produced by DAINIPPON INK & CHEMICALS, INC.) and 2% by weight of a cyan pigment (FG7400G, produced by TOYO INK MFG. CO., LTD.) as colorant was heated and kneaded at a temperature of 130° C. by means of a motor mill or homogenizer (produced by Hitachi Koki Co., Ltd.) until a homogeneous molten mixture was obtained (for about 6 hours). Subsequently, the mixture was filtered under heating and pressure to remove impurities therefrom, and then allowed to cool at room temperature to obtain three kinds of homogeneous hot-melt ink compositions.

These hot-melt ink compositions were then subjected to measurement of melt viscosity at 130° C., 135° C. ageing test for evaluation of fastness to separation and test for jettability from ink jet printer after 1 week of ageing in the apparatus in molten form in the same manner as in Example 1. The results are set forth in Table 4.

TABLE 4

| Example 7 | | | |
|---|---|---|---|
| Vehicle | UNILIN 425 | | |
| Pigment | PY93 | KET Red 309 | FG7400G |
| Viscosity (mPa·s)(130° C.) | 10 | 13 | 10 |
| Separation (135° C.) | Stable (>1 week) | | |
| Test for jettability from printer | Jetted from all nozzles | | |

All the ink compositions exhibited good dispersion stability and viscosity and could be fairly printed even after a prolonged ageing in molten form in the ink jet printer.

The hot-melt ink composition for ink jet recording of the present invention can satisfy the two requirements, i.e., dispersion stability and jettability, which have never been satisfied by those comprising a pigment as a colorant. Accordingly, an ink can be produced which can find wider application than those comprising a dye as a main colorant.

While the invention has been described in detail and with reference to specific embodiments thereof, it will be apparent to one skilled in the art that various changes and modifications can be made therein without departing from the spirit and scope thereof.

What is claimed is:

1. A hot-melt ink composition adapted for an ink jet recording process comprising the steps of:

heating an ink composition which stays as solid at room temperatures so that it is liquefied; and then applying some jetting energy to the ink composition through pressurization caused by displacement of a piezoelectric element so that it is jetted onto a recording medium in the form of ink droplet to form a recorded dot, said ink composition consisting essentially of a pigment and an alcoholic wax having a hydroxyl value of from 20 to 150 and a molecular weight of not lower than 375, which does not form bubbles upon heating, and said ink composition having a melt viscosity of from 5 to 30 mPa.s upon the use thereof.

2. The hot-melt ink composition according to claim 1, wherein said alcoholic wax is at least one wax selected from the group consisting of: alcoholic wax comprising, as a main component, a saturated straight-chain alcohol; paraffin wax; microcrystalline wax; and alcoholic wax prepared by oxidation reaction of petrolatum as a starting material.

3. The hot-melt ink composition according to claim 1, wherein said ink composition has a melting point of from 50° C. to 120° C.

4. The hot-melt ink composition according to claim 1, wherein said alcoholic wax is contained in an amount of not less than 20% by weight based on the weight of the composition.

5. The hot-melt ink composition according to claim 1, wherein said alcoholic wax has a hydroxyl value of from 60 to 130.

6. The hot-melt ink composition according to claim 2, wherein said alcoholic wax comprises, as a main component, a saturated straight-chain alcohol.

7. The hot-melt ink composition according to claim 6, wherein said alcoholic wax is a $C_{18-100}$ saturated straight-chain alcohol.

8. The hot-melt ink composition according to claim 3, wherein said alcoholic wax is a $C_{25-55}$ saturated straight-chain alcohol.

9. The hot-melt ink composition according to claim 3, wherein said ink composition has a melting point of from 70° C. to 100° C.

* * * * *